United States Patent
Huffman et al.

(10) Patent No.: US 7,294,271 B1
(45) Date of Patent: Nov. 13, 2007

(54) PROCESS FOR RESTORATION OF GROUND WATER USED IN IN-SITU URANIUM MINING

(75) Inventors: Leland A. Huffman, Glenrock, WY (US); Lawrence J. Reimann, Glenrock, WY (US)

(73) Assignee: Power Resources, Inc., Lakewood, CO (US)

( * ) Notice: Subject to any disclaimer, the term of this patent is extended or adjusted under 35 U.S.C. 154(b) by 316 days.

(21) Appl. No.: 11/157,693

(22) Filed: Jun. 20, 2005

(51) Int. Cl.
*C02F 3/00* (2006.01)
(52) U.S. Cl. ..................................... 210/610; 210/682
(58) Field of Classification Search ................ 210/610, 210/682
See application file for complete search history.

(56) References Cited

U.S. PATENT DOCUMENTS 5,833,855 A * 11/1998 Saunders .................... 210/611

* cited by examiner

Primary Examiner—Chester T. Barry
(74) Attorney, Agent, or Firm—Edwin H. Crabtree; Ramon L. Pizarro

(57) ABSTRACT

A process for biological restoration of ground water in a mineralized sandstone formation using a nutrient source. The process is used in conjunction with mining uranium using in-situ pump and treat technology. The restoration of the ground water is designed to meet federal and state regulations. The process includes pumping the contaminated ground water from the mineralized sandstone formation using production wells to the ground surface. The ground water is then circulated through at least one ion exchange column. The ion exchange column is used to capture any residual uranium remaining in solution. The treated ground water then flows from the ion exchange column through at least one reverse osmosus unit. The reverse osmosus unit is designed to help decrease any remaining dissolved solids in solution, such as sodium and chloride. From the reverse osmosus unit, the ground water is circulated through at least one de-carbonation column. The de-carbonation column is used to remove residual carbon dioxide in the ground water. Upon exiting the de-carbonation column, a nutrient source is introduced into the ground water for stimulating the indigenous bacteria in the mineralized sandstone formation. The ground water is now pumped back into the ground where it is reintroduced into the sandstone formation.

18 Claims, 2 Drawing Sheets

PROCESS FOR RESTORATION OF GROUND WATER USED IN IN-SITU URANIUM MINING

BACKGROUND OF THE INVENTION (a) Field of the Invention

This invention relates to a process for restoration of ground water used in mining and more particularly, but not by way of limitation, to a process for removing uranium, selenium and other minerals from ground water for obtaining acceptable federal and state regulatory ground water levels. The ground water used in an in-situ leach uranium mining operation.

(b) Discussion of Prior Art

In other in-situ uranium mining operation, chemical reductants have been added to a mineralized geological formation to create reducing conditions within a mining zone. The reductants used for ground water restoration. Typically, the chemical reductants include sodium sulfide, sodium sulfite, and hydrogen sulfide. A major disadvantage to this method is that the chemicals have the potential, under certain conditions, for creating a dangerous atmosphere, which can be fatal to humans.

In U.S. Pat. Nos. 4,108,722 and 4,206,193 to Stover, a restoration process is described wherein an in-situ uranium mining operation injects bacteria into a mineralized sandstone formation. The bacteria has been previously cultivated in bioreactors on the above ground surface.

In U.S. Pat. No. 5,324,491 to Lovely, an enzymatic reduction and precipitation process of uranium is described using bacteria. This patent deals primarily with above ground bioreactors. The ground water is passed through the bioreactors and the uranium is precipitated out inside the bioreactor.

In U.S. Pat. No. 5,554,290 to Suthersan, a remediation method is disclosed using an in-situ anaerobic reactive zone to precipitate heavy metals from the ground water and to achieve de-nitrification. The in-situ reactive zone provides a permeable barrier formed by using indigenous bacteria when carbohydrates are injected into the ground. The carbohydrates are a nutrient source for the indigenous bacteria, which metabolize the food source for providing free electrons. Sulfates, nitrates and redox sensitive organics and metals act as the electron acceptors. The reduction of sulfate provides the sulfide in the ground water, which the metal contaminants react with to form insoluble metal sulfide compounds. The insoluble metal sulfide compounds precipitate out of the ground water as it passes through the reactive zone.

In U.S. Pat. No. 5,710,361 to Harrington et al., a process of adding nutrients inside a passageway created in waste stacks and earth materials is disclosed. The process promotes the growth of the indigenous bacteria therein for producing microbial sulfides. However, this patent doesn't disclose or mention the interaction of circulating ground water through a mineralized sandstone formation, especially in a deep underground sandstone formation with a confined sandstone formation. Additionally, this patent does not include treating uranium as a contaminant that can be remediated when the ground water is circulated through the sandstone formation.

In U.S. Pat. No. 5,833,855 to Saunders, a method of adding ferrous iron and a carbon nutrient source to ground water is described. This patent's biological reduction method relies on a co-precipitation of the metals with an iron sulfide compound produced by sulfate reducing bacteria. Also, this patent's injection solution may include sulfate-reducing bacteria.

The subject process for restoration of ground water differs from the above-mentioned prior art in that it relies on indigenous bacteria already present within a mineralized sandstone formation. The process produces insoluble compounds of oxides, sulfides and iron minerals in the ground water, which are dropped out of solution when circulated through the mined rock system.

SUMMARY OF THE INVENTION

In view of the foregoing, it is a primary objective of the subject invention to provide a process for biological restoration of ground water in a mineralized sandstone formation using a nutrient source. The process is used in conjunction with mining uranium using in-situ pump and treat technology. The restoration of the ground water is designed to meet federal and state regulations.

Another object of the invention is the process re-circulates the ground water underground through a mined out mineralized sandstone formation for greater contact in the geological formation. This feature helps ensures a more complete clean up of the ground water left in the sandstone formation.

Yet another object of the process is the use of indigenous bacteria as a more efficient and less costly bioreactor rather than cultivating foreign bacteria. Therefore, there is no reliance on the addition of extra chemicals to the ground water, since the metals react directly with the indigenous bacteria as electron acceptors.

A further object of the process is the biological ground water restoration process not only precipitates out uranium but other metal oxides, metal sulfides and other minerals in the sandstone formation.

The subject process includes pumping the contaminated ground water from the mineralized sandstone formation using production wells to the ground surface. The ground water is then circulated through at least one ion exchange column. The ion exchange column is used to capture any residual uranium remaining in solution. The treated ground water then flows from the ion exchange column through at least one reverse osmosus unit. The reverse osmosus unit is designed to help decrease any remaining dissolved solids in solution, such as sodium and chloride. From the reverse osmosus unit, the ground water is circulated through at least one de-carbonation column. The de-carbonation column is used to remove residual carbon dioxide in the ground water. Upon exiting the de-carbonation column, a nutrient source is introduced into the ground water for stimulating the indigenous bacteria in the mineralized sandstone formation. The ground water is now pumped back into the ground where it is reintroduced into the sandstone formation.

These and other objects of the present invention will become apparent to those familiar with in-situ bioremediation of contaminated ground water when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
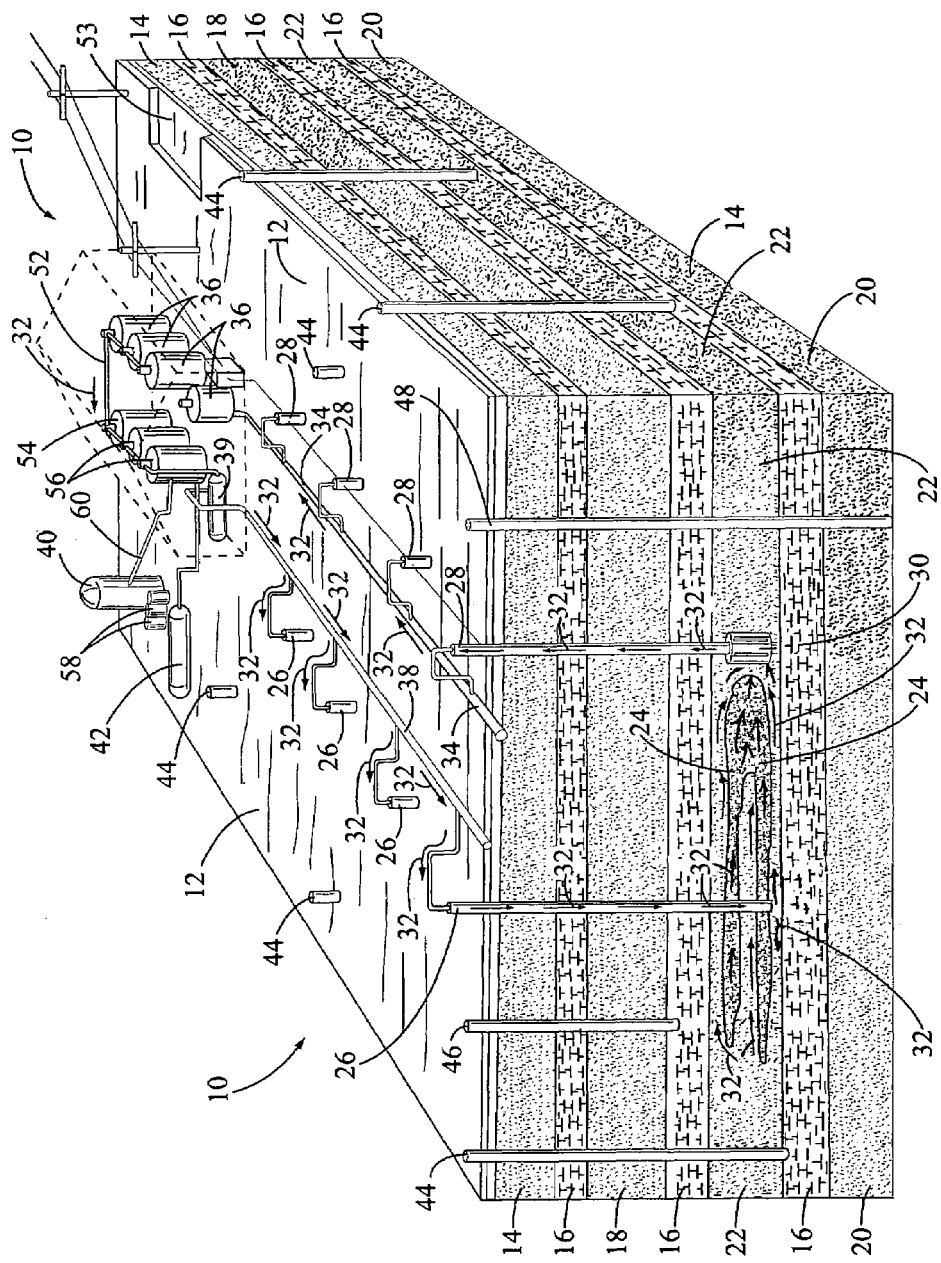
FIG. 1 is a perspective view of the overall in-situ uranium mining operation having a plurality of injection and production wells placed in the mineralized sandstone formation. The ground water in the sandstone formation is pumped upwardly through the production wells where the ground water is treated by removing the uranium in solution.

In-situ leach uranium mining is a process that makes viable the mining of ore deposits that normally would not be economical, by mining the ore "in place". The process involves an addition of an oxidant to mineralized ground water in order to oxidize the uranium from the less soluble +IV valence state to the more soluble and mobile +VI valence state. This process increases the concentration of uranium in the ground water, which is then recovered from the ground water using the mining operation's surface facilities. The surface facility, shown in FIG. 1, is an illustration of the Highland Uranium Project located in the southern Powder River Basin in Wyoming. This property is owned by the assignee of record of this patent application.

During the in-situ mining process, however, additional redox sensitive metals can also be oxidized and become more soluble, which increases their concentrations in the ground water. For example, selenium and arsenic are oxidized to a more soluble species during the mining operation. Also and depending on the chemistry of the ore body, other redox sensitive metals may become more soluble during the mining process. The redox sensitive metals include but are not limited to, vanadium and molybdenum.

Following the completion of ore removal in the in-situ mining operation, it is the responsibility of the mine operator to restore the ground water used in the mining process. In order to decrease the concentrations of redox sensitive metals, such as uranium and selenium, to acceptable regulatory standards, changing the condition of the mineralized sandstone formation to a reducing environment is one method that can be used. This will decrease the concentrations of these redox sensitive metals by forming less soluble complexes, which will decrease their concentrations in the ground water. As such, the subject restoration process has been developed at the mine site to create reducing conditions within the mining zone sandstone formation to decrease the concentrations of redox sensitive metals in the ground water, as part of a ground water restoration program. In addition, the biological reduction method is coupled with the use of a reverse osmosis pump and treat system, which enhances the restoration of the mining zone ground water.

In FIG. 1, a perspective view of an in-situ leach uranium mine operation is shown having general reference numeral 10. The mine operation 10 is disposed on top of a ground surface 12 using in-situ pump and treat technology for mining the uranium. This type of in-situ mine operation is often referred to as a "Wellfield" operation and the mining of the uranium ore underground and in-situ as a "ground water rock system". In this drawing, a cross-section of a subsurface 14 is shown having a plurality of impermeable geological formations 16, an upper sandstone formation 18, a lower sandstone formation 20 and a mineralized sandstone formation 22 having a uranium roll front deposit 24 therein.

A plurality of spaced apart injection wells 26 and spaced apart production wells 28 are drilled into the subsurface 14 so that a screen interval at the bottom of the wells is in the same horizon as the host mineralized sandstone formation 22 with the roll front deposit 24. The production wells 28 include submersible pumps 30 for pumping the ground water, shown as arrows 32, to the ground surface 12.

At the ground surface 12, the ground water 32 flows through a common intake pipe 34 to one or more ion exchange columns 36. The ion exchange columns 36 are used to remove the uranium from solution. The treated ground water 32 is now circulated to an injection pump 39 and pumped through a common discharge pipe 38 connected to the injection wells 26. Prior to the ground water 32 being re-circulated back to the mineralized sandstone formation 22 using the injection wells 26, the ground water is fortified with an oxidant from an oxygen tank 40 and carbon dioxide or a carbonate from a carbonate tank 42. The oxidant oxidizes the uranium, and other metals, which complexes with the carbonate in solution. This forms a very mobile anion, which is carried through the mineralized sandstone formation 22 from the bottom of the injection wells 26, through the sandstone formation 22, and to the bottom of the production wells 28. The treated ground water 32 is now pumped again to the ground surface 12 using the submersible pumps 30.

Once the mineralized sandstone formation 22 is depleted of uranium, the restoration of the ground water begins using the subject biological restoration process described herein. The mining operation 10 as shown in FIG. 1 also includes production monitoring wells 44, shallow monitoring wells 46 and deep monitoring wells 48 drilled into the subsurface 14 for monitoring the in-situ mining operation.

Figure 2:
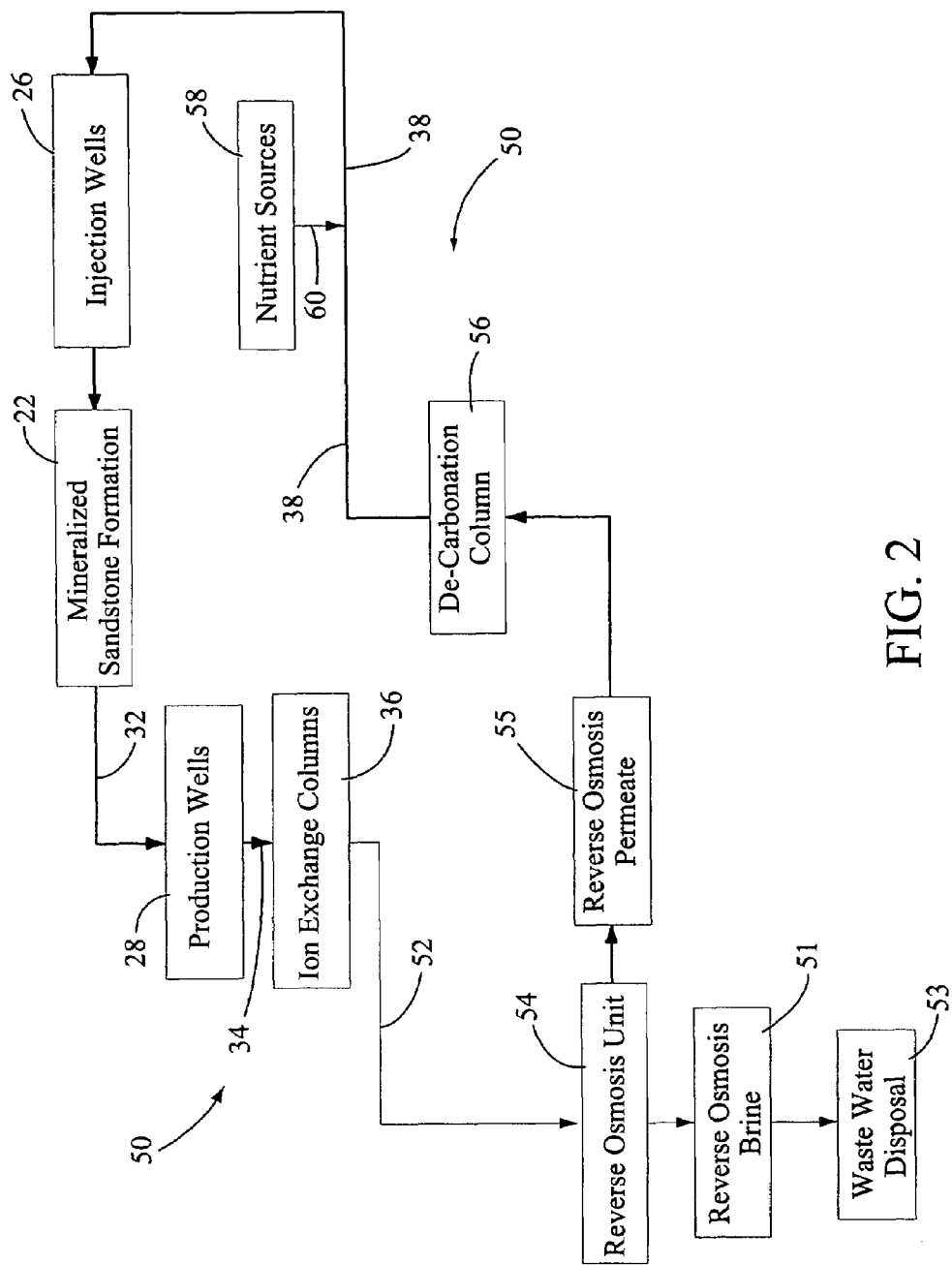
FIG. 2 is a process flow diagram illustrating the process steps and components required in restoring the ground water to acceptable federal and state regulatory ground water levels.

In FIG. 2, a process flow diagram is shown illustrating the steps and components required in restoring the ground water 32 to acceptable federal and state ground water regulations. The ground water restoration process is shown having a general reference numeral 50. As mentioned above, the process 50 is used for decreasing metal and non-metal concentrations in-situ in the ground water 32 circulated through the mineralized sandstone formation 22.

The process 50, with the additions of nutrients, involves reducing the metals from a higher valence state (oxidized) to a lower valence state (reduced), which generally causes the metals to form less soluble complexes. The metals are reduced, by acting as electron acceptors for the indigenous bacteria present in the sandstone formation 22. The bacteria colony is increased through the addition of a carbon nutrient source. The bacteria uses the carbon as an energy source, which results in excess electrons as waste products that need to be disposed of. The bacteria disposes of these electrons by adding them to the oxidized metals in solution, which leads to their precipitating from the solution in the sandstone formation. The insoluble complexes that are formed can include metal oxides ($UO_2$), metal sulfides (AsS) and iron minerals (FeSe). Also, other redox sensitive metals can be reduced to an elemental form, such as ($Se^0$), and precipitate from the solution. During laboratory and field testing, molasses, phosphoric acid, cheese whey and other similar food products were used as nutrients for the bacteria.

In FIG. 2, the affected or contaminated ground water 32 is circulated through the mined-out mineralized sandstone formation 22 from the injection wells 26 to the production wells 28. The ground water is then pumped from the sandstone formation 22 using the submersible pumps 30 and production wells 28. The ground water 32 flows through the intake pipe 34 to the ion exchange columns 36 for capturing any residual uranium that still remains in solution. It should be noted that until the ground water 32 has been returned to acceptable water standards, low concentrations of uranium will continue to leach from the mineralized sandstone formation. From the ion exchange columns 36, the ground water flows through a transfer pipe 52 to one or more reverse osmosis units 54. The units 54 are designed to decrease any remaining dissolved solids in solution. After treating the ground water in the reverse osmosis units 54, reverse osmosis brine 51 is removed and transferred to a wastewater disposal 53. The wastewater disposal can be an evaporation pond, a deep water disposal well and like means used for disposing of waste water.

The treated ground water 55, called permeate, from the reverse osmosis units 54 is now transferred to one or more de-carbonation columns 56. These columns 56 remove any residual carbon dioxide from the ground water. After the ground water exits the de-carbonation units 54, a nutrient source 58 from nutrient barrels or tanks for feeding the indigenous bacteria in the sandstone formation 22 is added to the ground water via a nutrient feed pipe 60 connected to the discharge pipe 38. The concentration of the nutrient source 58 to the ground water 32 can range from 5 mg/L to 2500 mg/L and greater. Also, the concentration of the nutrient source 58 to ground water 32 is can in a more narrow range of 50 mg/L to 400 mg/L.

It should be noted that as described above, the steps of circulating the ground water 32 through the ion exchange columns 36, through the reverse osmosis units 54 and through the de-carbonation columns 56 greatly enhance and shorten the time period required to treat the ground water 32, the most important step is treating the ground water 32 with the nutrient source 58 for simulating the bacteria colonies in the mineralized sandstone formation 22. Therefore, the ground water 32 can be treated independently with only the addition of the nutrient source 58. Also, the restoration process 50 can be extended over a period of time by re-circulating the treated ground water 32 through the sandstone formation 22 to meet acceptable water regulation standards. Also, during the re-circulating of the ground water 32, additional nutrients can be added.

During the initial laboratory testing of the proposed process 50, it was found that injecting the nutrient source 58 into the sandstone formation 22 proceeded more efficiently when added in conjunction with the treated ground water or permeate 55 from the reverse osmosis units 54. Also, by adding the nutrient to the permeate, the reduction of the minerals in solution in the ground water occurred at the same time as the ground water was being cleaned by the reverse osmosis units 54, which helped speed up the overall restoration process.

Through laboratory testing of the ground water 32 using the steps and components of the process 50, it was found that selenium concentration could be decreased from 2 ppm to 0.009 ppm and the uranium concentration decreased from 22 ppm to 0.14 ppm.

Based on the success of the laboratory testing, a field test was conducted at the mine operation 10. The initial uranium concentration in the mined-out sandstone formation 22 averaged 25 ppm and the selenium concentration averaged 1.21 ppm. After three months of operation using the subject process, the average selenium concentration dropped to 0.005 ppm and the uranium concentration started to trend downward slowly at about the same time. The average uranium concentration decreased to 15 ppm after six months of testing. The field test confirmed the earlier results obtained during the laboratory studies. Therefore, the tests proved that by providing nutrients to the native bacteria in the sandstone formation, the concentration of redox sensitive metals that remain in solution after mining could be greatly decreased to acceptable federal and state ground water quality regulations.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A process for restoration of ground water in a subsurface mineralized sandstone formation using a nutrient source, the process is used in conjunction with in-situ uranium mining, the process comprising:
   pumping contaminated ground water from the mineralized sandstone formation using a production well to a ground surface;
   introducing a nutrient source into the ground water for stimulating the indigenous bacteria in the mineralized sandstone formation;
   pumping the ground water with nutrient source back into the ground using an injection well where the ground water is reintroduced into the sandstone formation; and
   precipitating less soluble metal complexes from the ground water to the sandstone formation thereby reducing an overall metal content in the ground water.

2. The process as described in claim 1 further including a step of circulating the ground water through at least one ion exchange column prior to introducing the nutrient source into the ground water, the ion exchange column capturing any residual uranium remaining in solution in the ground water.

3. The process as described in claim 1 further including a step of circulating the ground water through at least one reverse osmosis unit prior to introducing the nutrient source to the treated ground water, the reverse osmosis unit for removing remaining solids in solution in the ground water.

4. The process as described in claim 1 further including a step of circulating the ground water through at least one de-carbonation column prior to introducing the nutrient source to the ground water, the de-carbonation column for removing residual carbon dioxide in the ground water.

5. The process as described in claim 1 wherein the nutrient source is added to the ground water in a range of 5 mg/L to 2500 mg/L.

6. The process as described in claim 1 further including a step of re-circulating the ground water from the mineralized sandstone formation using the production well to the ground surface and adding additional nutrients to the treated ground water.

7. A process for restoration of ground water in a subsurface mineralized sandstone formation using a nutrient source, the process is used in conjunction with in-situ uranium mining, the process comprising:
   pumping contaminated ground water from the mineralized sandstone formation using a production well to a ground surface;

introducing a nutrient source into the ground water for stimulating the indigenous bacteria in the mineralized sandstone formation;

pumping the ground water with nutrient source back into the ground using an injection well where the ground water is reintroduced into the sandstone formation; and circulating the ground water with nutrient source through the mineralized sandstone formation thereby stimulating the indigenous bacteria and reducing the metals in the ground water from a higher valence state (oxidized) to a lower valence state (reduced) causing the metals in the ground water to form less soluble metal complexes; and precipitating the less soluble metal complexes from the ground water to the sandstone formation thereby reducing an overall metal content in the ground water.

8. The process as described in claim 7 wherein the less soluble metal complexes include metal oxides, metal sulfides and iron metals.

9. The process as described in claim 7 further including a step of circulating the ground water through at least one ion exchange column, the ion exchange column capturing any residual uranium remaining in solution in the ground water and circulating the ground water from the ion exchange columns to a reverse osmosis unit prior to introducing the nutrient source to the treated ground water, the reverse osmosis unit for removing remaining solids in solution in the ground water.

10. The process as described in claim 9 further including a step of circulating the ground water received from the reverse osmosis unit through at least one de-carbonation column prior to introducing the nutrient source to the ground water, the de-carbonation column for removing residual carbon dioxide in the ground water.

11. The process as described in claim 7 wherein the nutrient source is added to the ground water in a range of 50 mg/L to 400 mg/L.

12. The process as described in claim 7 further including a step of re-circulating the ground water from the mineralized sandstone formation using the production well to the ground surface and adding additional nutrients to the treated ground water.

13. A process for restoration of ground water in a subsurface mineralized sandstone formation using a nutrient source, the process is used in conjunction with in-situ uranium mining, the process comprising:

pumping contaminated ground water from the mineralized sandstone formation using a production well to a ground surface;

circulating the ground water through at least one ion exchange column, the ion exchange column capturing any residual uranium remaining in solution in the ground water;

circulating the ground water from the ion exchange column to a reverse osmosis unit, the reverse osmosis unit for removing remaining solids in solution in the ground water;

introducing a nutrient source into the treated ground water from the reverse osmosis unit for stimulating the indigenous bacteria in the mineralized sandstone formation;

pumping the ground water with nutrient source back into the ground using an injection well where the ground water is reintroduced into the sandstone formation; and circulating the ground water with nutrient source through the mineralized sandstone formation thereby stimulating the indigenous bacteria and reducing the metals in the ground water from a higher valence state (oxidized) to a lower valence state (reduced) causing the metals in the ground water to form less soluble metal complexes; and precipitating the less soluble metal complexes from the ground water to the sandstone formation thereby reducing an overall metal content in the ground water.

14. The process as described in claim 13 wherein the less soluble metal complexes include metal oxides, metal sulfides and iron metals.

15. The process as described in claim 13 further including a step of circulating the ground water received from the reverse osmosis unit through at least one de-carbonation column prior to introducing the nutrient source to the ground water, the de-carbonation column for removing residual carbon dioxide in the ground water.

16. The process as described in claim 13 wherein the production wells include submersible pumps for pumping the ground water to the ground surface.

17. The process as described in claim 13 wherein the production wells are connected to the ion exchange column using a common intake pipe for delivering the ground water thereto.

18. The process as described in claim 13 wherein the injection wells are connected to the de-carbonation column using a common discharge pipe for delivering the treated ground water to the wells.

* * * * *